United States Patent [19]

Grise

[11] 4,452,482
[45] Jun. 5, 1984

[54] HATCH FRAME FOR VEHICLE CAPS

[75] Inventor: Richard L. Grise, Bristol, Ind.

[73] Assignee: R & T Frames, Inc., Elkhart, Ind.

[21] Appl. No.: 209,581

[22] Filed: Nov. 24, 1980

[51] Int. Cl.³ .............................................. B60P 3/42
[52] U.S. Cl. .................................. 296/10; 296/24 R;
296/29; 296/100
[58] Field of Search .............. 296/106, 100, 216, 163,
296/24 R, 201, 29, 164, 30, 181, 18 T, 30, 102,
10; 105/402; 403/172

[56] References Cited

U.S. PATENT DOCUMENTS

| 3,612,604 | 10/1971 | Stepp | 296/106 |
| 3,848,920 | 11/1974 | Linhart et al. | 296/106 |
| 3,897,100 | 7/1975 | Garjner | 296/10 |
| 3,955,845 | 5/1976 | Werner | 296/10 |
| 4,136,985 | 1/1979 | Taul | 296/102 |

OTHER PUBLICATIONS

Publication, "CK-200 Package", R. & T. Frames, Inc., Elkhart, Indiana, 1974.
Publication, "El Rancho-Quality Custom Fiberglass Caps", El Rancho, Elkhart, Indiana.

Primary Examiner—Richard A. Bertsch
Attorney, Agent, or Firm—Price, Heneveld, Huizenga & Cooper

[57] ABSTRACT

A hatch frame for vehicle caps, and the like, comprises an upper frame segment with a hinge for pivotally supporting a hatch door. A pair of side frame segments extend along the sides of the hatch door, and are connected with the sides of the cap framework. A pair of corner keys connect the side frame segments with opposite ends of the upper frame segment to form an inverted, generally U-shaped frame which both pivotally mounts the hatch door and structurally interconnects the sides of the framework without any intermediate framing.

16 Claims, 4 Drawing Figures

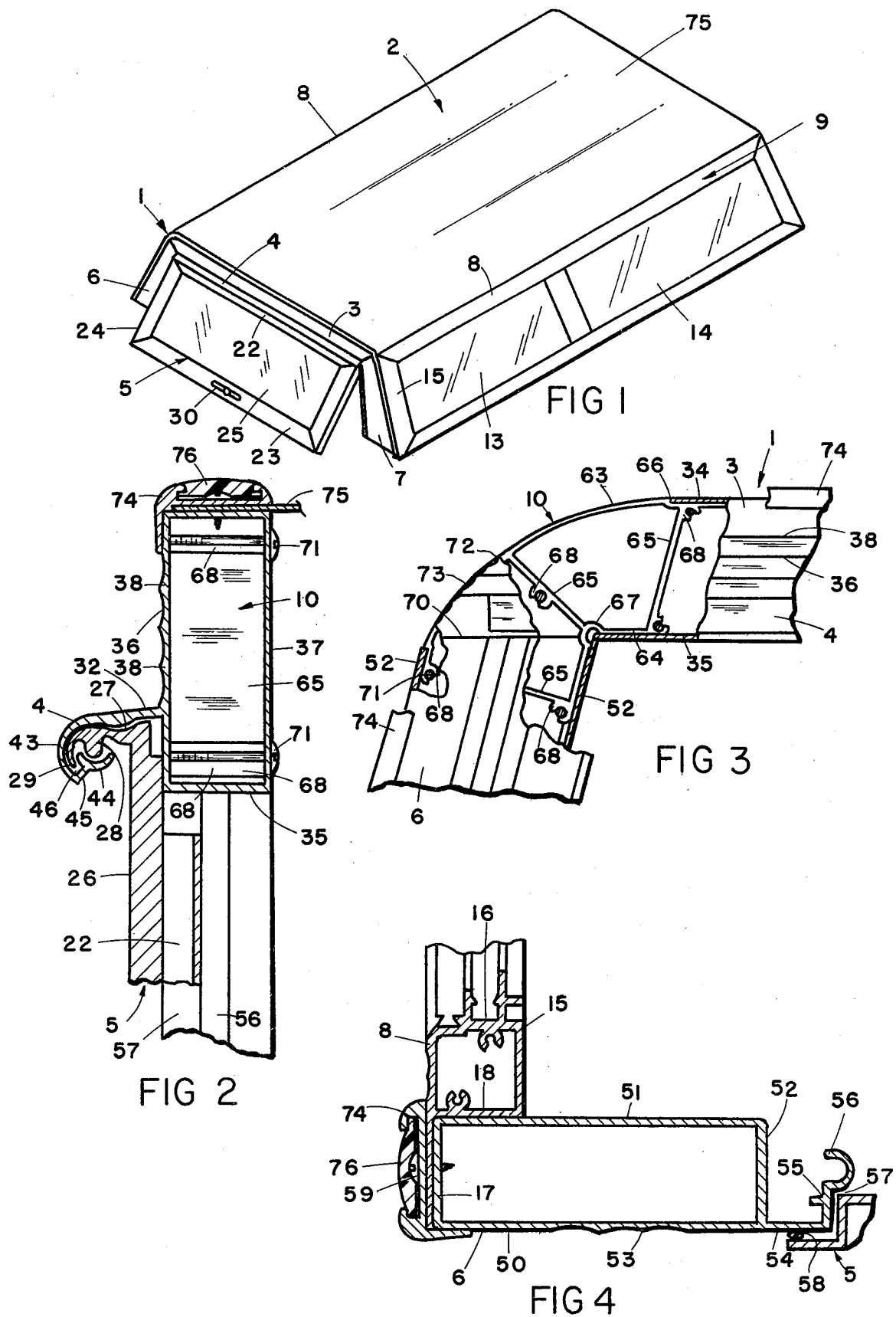

HATCH FRAME FOR VEHICLE CAPS

CROSS REFERENCE TO RELATED APPLICATIONS

The present application is related to my copending U.S. patent application Ser. No. 209,590, filed Nov. 24, 1980, entitled VEHICLE CAP CONSTRUCTION, which is hereby incorporated by reference.

BACKGROUND OF THE INVENTION

The present invention relates to vehicle caps, and the like, and in particular to a hatch frame assembly therefor.

Caps are used in conjunction with vehicles, such as pickup trucks, and the like, which have either a fully or partially open bed which is desired to be enclosed. Heretofore, aluminum vehicle caps have typically included a multiple piece assembly, such as that disclosed in the R & T Frames, Inc. publication entitled "CK-200 Package", noted in the Disclosure Statement. In these designs, four separate frame sections at the sides and ends of the cap are interconnected by fasteners to form a generally rectangular framework. The rear frame section is a seven-piece assembly which is welded together to form an inverted, generally U-shaped frame. The hatch door comprises a glass panel mounted in an aluminum frame which extends about the margin of the glass. The upper segment of this marginal frame includes a hinge half welded along the upper edge thereof. Intermediate framing is used to mount the hatch to the rear frame, and comprises three relatively flat intermediate framing members which are interconnected to form an inverted U-shaped configuration which mates with the shape of the rear section of the main skeletal framework. The upper member of the intermediate framing includes the mating hinge half which engages the hinge half on the hatch door to pivotally support the same. Each of the intermediate framing sections includes a plurality of spaced apart apertures along the outer edge thereof in which sheet metal screws are received to attach the intermediate framing to corresponding portions of the main framework. This type of construction is not only expensive to fabricate, but also is quite prone to develop rattles, because the fasteners which interconnect the various parts of the assembly tend to loosen during use.

SUMMARY OF THE INVENTION

One aspect of the present invention is to provide a hatch frame for vehicle caps and the like, comprising an upper frame segment having a hinge member for pivotally supporting a hatch door thereon. First and second side frame segments are shaped to extend along the sides of the hatch door, and are adapted for connection with the framework of the vehicle cap. The side frame segments are connected with opposite ends of the upper frame to form an inverted, generally U-shaped frame, which both pivotally mounts the hatch door thereon, and structurally interconnects the sides of the framework without intermediate framing. Preferably, corner keys are used to interconnect the hatch frame segments, and the hinge members used to mount the hatch door are integrally formed with the corresponding frame segments.

The principal objects of the present invention are to provide a hatch frame which both pivotally mounts the hatch door, and structurally interconnects the framework without any intermediate framing. The hatch frame has fewer segments, thereby reducing material cost, assembly effort, inventory cost, and other related expenses. Also, the frame provides a stronger design which is more durable and substantially alleviates rattling. The present hatch frame assembly provides a neat appearance which is quite weatherproof to prevent moisture from entering the cap. Integrally formed hinge members, as well as corner keys, which are for the first time used in the combination, form an extremely rigid hatch frame having a minimum number of fasteners.

These and other features, advantages, and objects of the present invention will be further understood and appreciated by those skilled in the art by reference to the following written specification, claims and appended drawings.

BRIEF DESCRIPTION OF THE DRAWINGS

FIG. 1 is a perspective view of a vehicle cap having a hatch frame embodying the present invention, with the hatch door shown in open position.

FIG. 2 is a fragmentary, vertical cross-sectional view of the hatch and frame, with the hatch door shown in a closed position.

FIG. 3 is a fragmentary, rear elevational view of the hatch frame, with portions thereof broken away to show a corner key construction.

FIG. 4 is a horizontal cross-sectional view of a side segment of the hatch frame, shown attached to the framework of the cap, and a fragmentary portion of the hatch door shown in a closed position.

DETAILED DESCRIPTION OF THE PREFERRED EMBODIMENTS

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a hatch frame for vehicle caps 2 and the like, comprising an upper frame segment 3 with a hinge member 4 for pivotally supporting a hatch door 5. A pair of side frame segments 6 and 7 extend along the sides of hatch door 5, and are connected with the sides 8 of the cap framework 9. A pair of gussets or corner keys 10 (FIG. 3) connect side frame segments 6 and 7 with opposite ends of upper frame segment 3 thereby imparting an inverted, generally U-shaped configuration to the hatch frame 1, which both pivotally mounts hatch door 5 and structurally interconnects the sides 8 of the skeletal framework 9 of vehicle cap 1 without any intermediate framing.

The basic framework 9 (FIG. 1) for vehicle cap 2 is identical with that disclosed in my copending patent application Ser. No. 209,590, filed Nov. 24, 1980, entitled VEHICLE CAP CONSTRUCTION, and includes side frame segments 8 in which stationary and sliding windows 13 and 14 are mounted. Both side frame assemblies 8 include an end frame section 15 at the rear of vehicle cap 2, which includes a channeled interior side 16 (FIG. 4) in which the sliding window 14 is mounted, and a flange 17 extending perpendicularly from the exterior edge of the channel base 18 for connecting side frame members 8 with the sides of hatch frame 1.

The hatch door 5 (FIG. 1) is of a conventional construction, and includes upper, lower and side frame segments 22–24 respectively, which are interconnected at mitered edges to form a frame in which a glass panel 25 is mounted. A male hinge member 26 (FIG. 2) is an integral part of the upper frame segment 22 of hatch door 5 along the upper edge thereof, and includes an outwardly projecting arm 27 with a depending, arcuately shaped rib 28 which forms a bearing surface to mate with hinge member 4. An arcuate, peninsular guide 29 extends from rib 28 and is adapted to mate the configuration of hinge member 4 to facilitate smooth pivoting of the hatch. In this example, a standard latch 30 (FIG. 1) is mounted in the lower segment 23 of hatch door 5 to selectively lock hatch door 5 in a closed position in hatch frame 1.

As best illustrated in FIGS. 2 and 3, the upper frame segment 3 of hatch frame 1 has a hollow, tubular body with a substantially rectangular transverse cross-sectional shape. Frame segment 3 includes upper, lower, front and rear walls 34–37 respectively, which are preferably integrally formed, such as an extruded aluminum channel. Front wall 36 includes three arcuately shaped ribs 38 extending longitudinally along a medial portion thereof, which add rigidity to the structure and mate with similarly shaped ribs on the exposed portions of cap framework 9 to present a neat, attractive appearance. The illustrated ribs 38 are formed by a pair of intersecting, concave sidewalls.

Hinge member 4 (FIG. 2) includes an arm 32 which extends outwardly from the front or exterior wall 36 of frame segment 3 at an angle which is slightly greater than 90 degrees, such that water will drain off of the top surface of the arm. The outer end 43 of arm 32 is turned arcuately inwardly, and includes a semi-cylindrically shaped bearing pad 44 attached thereto by a radially oriented arm 45. Bearing pad 44 faces upwardly, and is shaped to receive the rib 28 of mating hinge member 26 abuttingly therein. An arcuate space 46 is formed between the curved outer end 43 of arm 32 and bearing pad 44 in which guide 29 is received. When hatch door 5 is in the fully closed position, guide 29 is disposed in arcuately shaped space 46 to positively lock the upper edge of the door in position. Preferably, hinge member 4 is extruded integrally with frame segment 3 to provide both a rigid, durable and weathertight construction, as well as a neat appearance.

The side frame segments 6 and 7 are constructed from the same type of channel segment, and as best illustrated in FIGS. 3 and 4, include a hollow body, with a substantially rectangular transverse cross-sectional shape formed by outer and inner sidewalls 50 and 51, and end walls 52. Longitudinally extending, arcuate ribs 53 on outer wall 50 add rigidity to the frame section and mate with ribs 38 to present a pleasant, streamlined appearance. The frame section walls 50–52 inclusive are preferably integrally formed, such as from extruded aluminum channel, and include a flange 54 extending from the interior end wall 52. Flange 54 includes an in-turned segment 55, with an arcuately shaped free end 56 to form a ledge 57 of sufficient depth to receive at least a portion of the hatch door 5 therein. A resilient seal 58 is positioned between the interior side of hatch door 5 and the abutting portion of wall 54 to form a weathertight seal therebetween. In this example, seal 58 is attached to hatch door 5.

The left and right-hand segments 6 and 7 of hatch frame 1 are securely attached to the sides 8 of cap framework 9. The inner corner of side frames 6 (FIG. 4) are received between the base 18 and flange 17 of the associated side frame section 8. Fasteners 59 attach flange 17 to channel wall 52 along the height of the vehicle cap to securely interconnect the same.

With reference to FIG. 3, the upper and side frame segments 3, 6 and 7 respectively are interconnected at the upper corners of hatch frame 1 by a pair of corner keys 10. Each corner key has a web-like construction, and includes an arcuate outer brace 63, a generally L-shaped inner brace 64, and at least three cross braces 65 interconnecting the arcuate and inner braces at the ends and center of the key. The ends of the corner keys are generally rectangular in shape, and are telescopically received into the interior of the adjacent frame channels 3, 6 and 7. The legs of inner brace 64 are angled in accordance with the shape of the hatch opening. The arcuate brace 63 includes a notch 66 at each end of the key in which frame walls 34 and 53 are received to form a flush exterior curvature. The legs of inner brace 64 intersect at a boss 67 in the nature of an open-sided or split sleeve in which the aubtting edges of frame segment walls 35 and 52 are received. Fastener sleeves or channels 68 are provided at both ends of the outer cross braces 65, as well as at the center of central cross brace 65. The channels 68 are adapted to receive fasteners therein to interconnect the keys 10 with the frame segments, as described in greater detail hereinafter. The open side of the fastener channels 68 at the ends of corner key 10 are inclined inwardly at an angle in the nature of 45° to facilitate secure connection. The open side of the center fastener channel 68 is disposed perpendicular with center brace 65.

To interconnect an upper and side frame segment of hatch frame 1, such as segments 3 and 6 shown in FIG. 3, the end of frame segment 6 is first cut at an angle or mitered, so that the end edge 70 mates with the lower edge of frame segment 4. In the illustrated example, end 70 is disposed substantially horizontal. Next, lower wall 35 of upper frame segment 3 is removed from the frame segment, such that the sidewalls 36 and 37 of the channel can extend over the corner key, permitting the lower edge to abut the mitered end 70 of frame segment 6. The ends of the walls 34 and 35 are positioned in the associated corner key notches 66 and 67. The sidewalls 36 and 37 of the hatch frame segment 3 are then trimmed along the arcuate brace 63 of the corner key 10. Fasteners 71 are then inserted through the interior faces 37 and 51 of the hatch frame segments into the corresponding fastener sleeves 68, thereby securely attaching the corner keys 10 to the hatch frame segments and interconnecting the frame members. It is to be understood that the corner keys could also be welded in place in lieu of fasteners 71. The cut, arcuate edges 72 may be attached to the associated corner key along brace 63 by welds 73. An L-shaped, extruded aluminum molding strip 74 extends around the outer edge of the hatch frame to cover the end of flanges 17, and roof 75 is attached to the frame by fasteners 59. A flexible, resilient strip 76, constructed of vinyl, or the like, is mounted in molding 74 to cover the heads of fastners 59 and form a weathertight seal therefor.

The U-shaped hatch frame 1 both pivotally mounts hatch door 5 and structurally interconnects the sides 8 of vehicle cap framework 9 without any intermediate framing. The hatch frame construction minimizes the number of separate parts and fasteners required in the assembly, thereby reducing manufacturing material, inventory, and other related costs, as well as providing a durable, rattle-free, lightweight vehicle cap. The corner keys rigidly interconnect the hatch frame segments, and form a strong weathertight construction with a neat, sleek appearance.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a vehicle cap and the like, having a framework with front, back and opposite side portions, the improvement of a hatch frame, comprising:
   an upper frame segment having a hinge member pivotally supporting a hatch door thereon;
   first and second side frame segments extending along the sides of said hatch door in a closed position, and being connected with the framework of said vehicle cap; and
   means for connecting said first and second side frame segments with opposite ends of said upper frame segment to form an inverted, generally U-shaped hatch frame; said side frame segments including an integrally formed, recessed ledge, which extends along the interior edges of said side frame segments, and is shaped to receive at least a portion of said hatch door therein,
   a seal positioned between said hatch frame and said hatch door, whereby said hatch frame both pivotally mounts said hatch door therein with a weathertight seal, and structurally interconnects the side portions of said framework without intermediate framing.

2. A hatch frame as set forth in claim 1, wherein: said hinge member is integral and one-piece with said upper frame segment.

3. A hatch frame as set forth in claim 2, wherein: said hinge member extends outwardly from an exterior side of said upper frame segment adjacent a lower edge thereof, and includes an inwardly turned free end with an arcuate bearing pad on which said hatch door is pivotally suspended.

4. A hatch frame as set forth in claim 1, wherein said frame side portions, each have a vertically disposed end member with an exterior flange fastened to an associated one of said hatch frame side segments.

5. A hatch frame as set forth in claim 4, wherein: said connection means comprises first and second corner keys.

6. A hatch frame as set forth in claim 5, wherein: said frame segments are tubular with hollow body; and said corner keys are received telescopingly into the ends of adjacent frame segments to interconnect the same.

7. A hatch frame as set forth in claim 5, wherein: said corner keys include fastener channels at each end thereof for attaching said corner keys with said adjacent frame segments.

8. A hatch frame as set forth in claim 7, wherein: said corner keys have an arcuately shaped outer edge.

9. A hatch frame as set forth in claim 1, wherein: said hinge member extends outwardly from an exterior side of said upper frame segment adjacent a lower edge thereof, and includes an inwardly turned free end with an arcuate bearing pad on which said hatch door is pivotally suspended.

10. A batch frame as set forth in claim 1, wherein: said framework side portions each have a vertically disposed end member with an exterior flange fastened to an associated one of said hatch frame side segments.

11. A hatch frame as set forth in claim 1, wherein: said frame segments are tubular with a hollow body; and said corner keys are received telescopingly into the ends of adjacent frame segments to interconnect the same.

12. A hatch frame as set forth in claim 1, wherein: said corner keys include fastener channels at each end thereof for attaching said corner keys with said adjacent frame segments.

13. A hatch frame as set forth in claim 1, wherein: said corner keys have an arcuately shaped outer edge.

14. A hatch frame as set forth in claim 1, wherein: said hinge member is shaped to pivotally suspend the hatch door thereon.

15. A hatch frame as set forth in claim 1, wherein: said hinge member is integral and one piece with said upper frame segment.

16. In a vehicle cap and the like, the improvement of a hatch frame, comprising:
   an upper frame segment having a hinge member pivotally supporting a hatch door thereon;
   first and second side frame segments extending along the sides of said hatch door in a closed position, and being connected with a framework of said vehicle cap; and
   first and second corner keys connecting said first and second side frame segments with opposite ends of said upper frame segment to form an inverted, generally U-shaped frame which both pivotally mounts said hatch door therein and structurally interconnects side portions of said framework without intermediate framing; said corner keys including faster channels at each end thereof for attaching said corner keys with adjacent frame segments.

* * * * *

UNITED STATES PATENT AND TRADEMARK OFFICE
CERTIFICATE OF CORRECTION

PATENT NO.  : 4,452,482
DATED       : June 5, 1984
INVENTOR(S) : Richard L. Grise It is certified that error appears in the above-identified patent and that said Letters Patent is hereby corrected as shown below:

Column 4, line 22:
"aubtting" should be --abutting--;

Column 5, line 56:
After "with" insert --a--;

Column 6, line 4:
"5" should be --6--;

Column 6, line 16:
"batch" should be --hatch--.

Signed and Sealed this

Twenty-sixth Day of February 1985

[SEAL]

Attest:

DONALD J. QUIGG

Attesting Officer     Acting Commissioner of Patents and Trademarks